(12) United States Patent
Sun et al.

(10) Patent No.: US 11,098,579 B1
(45) Date of Patent: Aug. 24, 2021

(54) ELECTRODE TYPE NEAR BIT WIRELESS SHORT DISTANCE TRANSMISSION MODULATION METHOD AND APPARATUS

(71) Applicant: Institute of Geology and Geophysics, Chinese Academy of Sciences, Beijing (CN)

(72) Inventors: Yuntao Sun, Beijing (CN); Wenxuan Chen, Beijing (CN); Qingyun Di, Beijing (CN); Jian Zheng, Beijing (CN); Wenxiu Zhang, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/222,996

(22) Filed: Apr. 5, 2021

(30) Foreign Application Priority Data

May 14, 2020 (CN) .......................... 202010407633.X

(51) Int. Cl.
*E21B 47/125* (2012.01)
*E21B 47/20* (2012.01)
(Continued)

(52) U.S. Cl.
CPC .......... *E21B 47/125* (2020.05); *E21B 47/013* (2020.05); *E21B 47/20* (2020.05); *H04L 1/0061* (2013.01); *H04L 27/12* (2013.01)

(58) Field of Classification Search
CPC ............................... E21B 47/135; E21B 47/12
See application file for complete search history.

(56) References Cited

U.S. PATENT DOCUMENTS

| 2018/0058199 A1* | 3/2018 | Sun .................. E21B 47/13 |
| 2019/0052374 A1 | 2/2019 | Lie et al. |

FOREIGN PATENT DOCUMENTS

| CN | 1657742 A | 8/2005 |
| CN | 106246167 A | 12/2016 |

(Continued)

OTHER PUBLICATIONS

He, Hu; Electromagnetic Induction Based Short-Distance Wireless Data Transmission and its Application in Measurement While Drilling; A Thesis Submitted in Partial Fulfillment of the Requirements for the Degree of Master of Engineering; Hua zhong University of Science and Technology, Wuhan, Hubei, China, May 2015.

(Continued)

*Primary Examiner* — Kevin Kim
(74) *Attorney, Agent, or Firm* — Novick, Kim & Lee, PLLC; Allen Xue

(57) ABSTRACT

An electrode-type near-bit wireless short-distance transmission modulation method includes the steps of by a near-bit measuring tool, measuring parameters, and acquiring parameter information, and packing the parameter information into a data packet, and transmitting the data packet to a transmission processor part; by the transmission processor part, performing binary frequency shift keying modulation on the data packet, and according to a set transmission power and driving source power, passing the modulated data packet through an amplifying circuit and a driving circuit, and then loading the modulated data packet to positive and negative electrodes of a transmitter; and by the positive and negative electrodes of the transmitter, transmitting the modulated data packet passed through the amplifying circuit and the driving circuit to a receiver, so as to realize electrode-type wireless short-distance transmission modulation.

16 Claims, 3 Drawing Sheets

(51) Int. Cl.
  *H04L 27/12* (2006.01)
  *H04L 1/00* (2006.01)
  *E21B 47/013* (2012.01)

(56) References Cited

FOREIGN PATENT DOCUMENTS

| CN | 109653742 A | 4/2019 |
|---|---|---|
| CN | 110630253 A | 12/2019 |

OTHER PUBLICATIONS

He, Wei; Research on electromagnetic wave wireless transmission technology of near bit; China Master's Thesis Full-text Database Engineering Science and Technology Series I, Aug. 15, 2018.

\* cited by examiner

| AA | 55 | Upper gamma | Lower gamma | Well deviation H | Well deviation L | Azimuth | Rotate speed | Temperature | CRC |

Fig. 5

| AA | 55 | Upper gamma | Lower gamma | Well deviation H | Well deviation L | CRC |

ELECTRODE TYPE NEAR BIT WIRELESS SHORT DISTANCE TRANSMISSION MODULATION METHOD AND APPARATUS

FIELD

The present invention belongs to the technical field of near-bit logging while drilling and in particular relates to an electrode-type near-bit wireless short-distance transmission modulation method and apparatus.

BACKGROUND

Electrode-type near-bit wireless short-distance transmission is mainly used for transmitting near-bit measured data to an MWD (Measure While Drilling) system across a screw rod in a wireless mode during logging while drilling. The data is transmitted to a ground system by a mud pulse generator of the MWD system or an electromagnetic wave technology, thereby directing drilling operating personnel to judge a drilling stratum condition and a drilling attitude of a current bit attachment.

As shown in FIG. 1, a near-bit wireless short-distance transmission apparatus is composed of a transmitter and a receiver, the transmitter is electrically and mechanically connected with a near-bit measuring tool, and the transmitter is divided into a positive transmitting electrode and a negative transmitting electrode by an isolating layer (GAP). A screw rod is bridged between the transmitter and the receiver, the receiver is also divided into a positive receiving electrode and a negative receiving electrode by an isolating layer, the negative receiving electrode of the receiver is in mechanical hard connection with the negative transmitting electrode of the transmitter (by the screw rod), thus a current loop is formed from the positive transmitting electrode to the positive receiving electrode and then to the negative transmitting electrode, and whereby a function of transmitting information of a near-bit measuring tool to the MWD system is achieved. Due to the structural features of the screw rod, generally, it is impossible to realize wired communication between a transmitting apparatus and a receiving apparatus by using an insertion wire unless the structure of the screw rod is reformed, and the wired communication can be realized by using the insertion wire pre-embedded in the screw rod. However, such a structure has limitations in its application so as to be basically abandoned. Near-bit short-distance transmission develops towards a wireless transmission mode. Wireless short-distance transmission is mainly realized in two modes including an electrode mode and a coil mode.

At the present stage, information mainly provided to field operating personnel on the ground by the near-bit mainly comprises gamma parameters and well deviation information of a drilling stratum. In some operations, it is still necessary to provide information such as a drilling rate of a bit and a battery state of a near-bit measuring tool. Gamma information is beneficial to the increment of the drilling rate (a proportion of drilling in an oil-gas reservoir or a coal bed) of drilling operation, while well deviation, the drilling rate and the battery state can assist in performing the drilling operation and increase the drilling efficiency. Since the drilling rate is very low in actual operation (which is related to lithologic components of the drilling stratum, and the drilling rate is generally 10 m/h), the amount of information wirelessly transmitted by the near-bit is not high. Meanwhile, the MWD system realizes uploading by virtue of mud waves pulse or electromagnetic waves, the transmission rate is 0.5-6 bps, and thus, demands can be met if the wireless short-distance transmission rate reaches 20 bps during actual application.

A classical signal transmission mode comprises two types, i.e., baseband transmission and modulated carrier transmission. Baseband transmission means that a transmitted code element is not adjusted in any way and is directly loaded into a channel in a binary form, such a mode is suitable for short-distance and high-speed communication, such as high-speed serial communication and SPI communication, and has the advantages of high transmission rate, but has short transmission distance and poor anti-interference capability. The other mode is carrier communication such as FSK (Frequency Shift Keying) and PSK (Phase Shift Keying). The baseband transmission mode is not suitable for the field of near-bit wireless short-distance transmission, and the carrier communication is suitable for low-rate and high-interference environments in the field.

SUMMARY

In order to solve the above-mentioned problems, the present invention provides an electrode-type near-bit wireless short-distance transmission modulation method and apparatus using a modulation mode of 2FSK, that is, binary frequency shift keying to realize a signal modulation method for a near-bit measuring tool while drilling, and a circuit is simple in implementation.

According to a first aspect of the present invention, an electrode-type near-bit wireless short-distance transmission modulation method is provided. The method comprises:

measuring, by a near-bit measuring tool, parameters to acquire parameter information, packing the parameter information into a data packet, and transmitting the data packet to a transmission processor part;

performing, by the transmission processor part, binary frequency shift keying modulation on the data packet, and loading the modulated data packet passing through an amplifying circuit and a driving circuit to positive and negative electrodes of a transmitter according to a set transmission power and driving source power; and transmitting, by the positive and negative electrodes of the transmitter, the modulated data packet passing through the amplifying circuit and the driving circuit to a receiver so as to realize electrode-type wireless short-distance transmission modulation.

Further, the parameters comprise drilling deviation information, gamma information, number-of-revolutions information, instrument state information and/or temperature information.

Further, the data packet is transmitted to the transmission processor part by a wired 485 interface.

Further, after measuring parameters to acquire parameter information, and packing the parameter information into a data packet, the near-bit measuring tool further comprises the following operation: adding packet headers 0xAA and 0x55 in front of the data packet, adding cyclic redundancy check (CRC) at the rear of the data packet, and then, transmitting the data packet to the transmission processor part.

Further, bitwise XOR or addition is adopted as a check mode.

Further, before performing binary frequency shift keying modulation on the data packet, the transmission processor part further comprises the following operation: performing detection on the packet header and CRC after receiving the data packet, and if a detection result is right, performing binary frequency shift keying modulation on the overall data packet as information to be transmitted.

Further, the data packet is subjected to binary frequency shift keying modulation according to bits, and a modulation rule is described as follows:

Bit=0, carrier wave f1=1.0 kHz, and there are 20 periods; and

Bit=1, carrier wave f2=1.5 kHz, and there are 40 periods.

Further, the transmission processor part is an STM32-series ARM processor with a DAC output function.

Further, the transmission processor part sequentially completes modulation for each bit of a data packet to be transmitted according to the modulation rule, and the transmission time is N*20 ms, wherein N is a total number of transmitted bits.

According to a second aspect of the present invention, an electrode-type near-bit wireless short-distance transmission modulation system is provided. The system comprises:

a near-bit measuring tool, for measuring parameters to acquire parameter information, packing the parameter information into a data packet, and transmitting the data packet to a transmission processor part;

the transmission processor part, for performing binary frequency shift keying modulation on the data packet, and loading the modulated data packet passing through an amplifying circuit and a driving circuit to positive and negative electrodes of a transmitter according to a set transmission power and driving source power; and the positive and negative electrodes of the transmitter, for transmitting the modulated data packet passing through the amplifying circuit and the driving circuit to a receiver so as to realize electrode-type wireless short-distance transmission modulation.

The present invention has the beneficial effects:

according to technical solutions of the present invention, arbitrary-length modulated transmission of near-bit wireless short-distance transmission can be realized. The method is simple in implementation, information required to be transmitted can be flexibly configured according to a demand of an actual drilling field before downhole operation so as to be convenient for field operating personnel to use, the working efficiency is increased, and drilling risks are reduced.

Specific embodiments comprise:

1. Arbitrary-length modulated transmission can be realized. When a near-bit instrument is used, a field worker (a ground geosteering engineer) needs to acquire geosteering information such as the attitude (well deviation, azimuth and tool face angle) of a bit, the temperature nearby the bit, the resistivity of a stratum, the drilling rate of the bit and annulus pressure in real time, but not all information needs to be acquired at any moment (due to limitations from a mud pulse uploading rate during MWD). In the present invention, due to simple configuration performed before downhole operation, the geosteering information required to be acquired this time can be uploaded to the ground by MWD after being subjected to short-distance transmission modulation and demodulation, the configuration is flexible, and therefore, the total power consumption of transmission is reduced, and the service life of a battery is prolonged.

2. The modulation mode is simple and practical, a modulation algorithm is realized by virtue of processor software, a hardware structure is not affected by severe environments such as temperature as well as downhole vibration and impact, and therefore, the modulation mode has very high stability.

3. By using the modulation method provided by the present invention, arbitrary information of the measuring tool can be modulated into a signal form of wireless short-distance transmission, communication with the measuring tool is simple and feasible and can be realized by simple 485 communication.

4. In the present invention, a field environment where the near-bit instrument is applied is taken into sufficient consideration, and the reliability is guaranteed under a severe environment with high temperature and high vibration and impact. Due to the selection of an FSK modulation frequency point, influences from the environment can be minimized under a severe downhole environment.

5. A field engineering application test has been completed by applying a near-bit wireless short-distance transmission instrument researched in the present invention, and therefore, the reasonability and feasibility of the present invention at this part are sufficiently described.

BRIEF DESCRIPTION OF THE DRAWINGS

In order to more clearly describe technical solutions in embodiments of the present invention or the prior art, accompanying drawings required for describing the embodiments or the prior art will be briefly introduced hereinafter. It is apparent that the accompanying drawings in the following description show merely some embodiments of the present invention, and a person of ordinary skill in the art can still derive other accompanying drawings from structures shown according to these accompanying drawings without creative efforts.

FIG. 5 shows a schematic diagram of a data packet transmission structure according to an embodiment of the present invention; and FIG. 6 shows a schematic diagram of a data packet transmission structure according to another embodiment of the present invention.

The purpose achievement as well as functional features and advantages of the present invention will be further described in conjunction with the embodiments by reference to the accompanying drawings.

DETAILED DESCRIPTION OF THE EMBODIMENTS

Exemplary embodiments will be described in detail herein, and examples of the exemplary embodiments are shown in the accompanying drawings. If the following description is involved to the accompanying drawings, the same numerals in the different accompanying drawings indicate same or similar elements unless otherwise denoted. Implementation approaches described in the following exemplary embodiments do not represent for all the implementation approaches consistent with the present disclosure. On the contrary, they are merely examples of an apparatus and method which are described in detail in appended claims and consistent with some aspects of the present disclosure.

Terms such as "first" and "second" in the description and claims of the present disclosure are intended to distinguish similar objects, rather than to describe a specific order or precedence order. It should be understood that data used in such a way can be exchanged under an appropriate condition so that the embodiments described herein can be executed according to an order except those illustrated or described herein. In addition, terms "comprise", "have" and any modifications thereof are intended to cover non-exclusive inclusion, for example, processes, methods, systems, products or devices including a series of steps or units is not limited to clearly list those steps or units, but can comprise other steps or units which are not listed clearly or are intrinsic for these processes, methods, products or devices.

"A plurality of" comprises two or more.

It should be understood that "and/or", as for a term "and/or" used in the present disclosure, merely represents an association for describing associated objects and means that three relationships can exist. For example, A and/or B can represent three conditions that A exists alone, A and B exist at the same time, and B exists alone.

Figure 1:
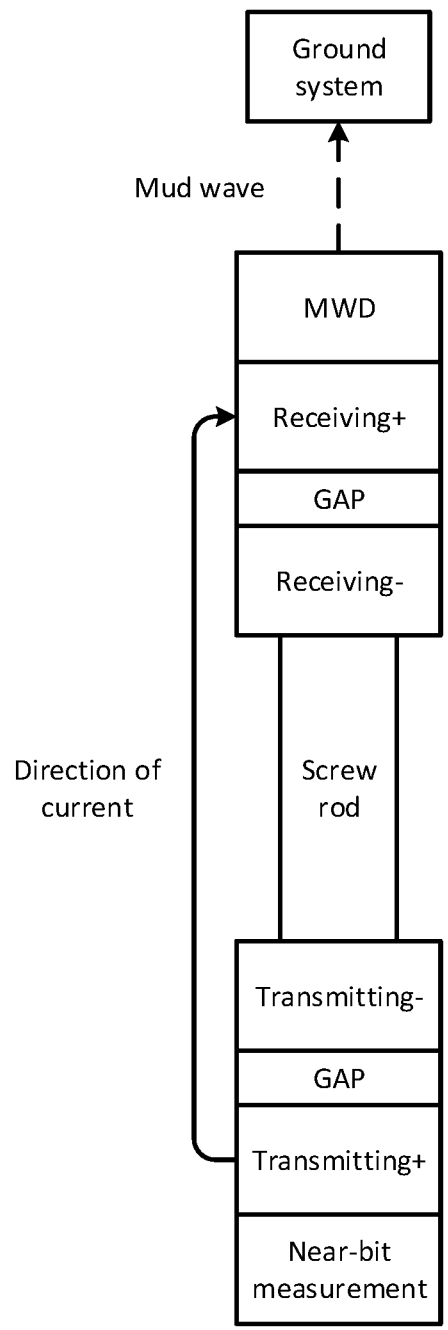
FIG. 1 shows a structural diagram of a near-bit wireless short-distance transmission apparatus.
Figure 2:
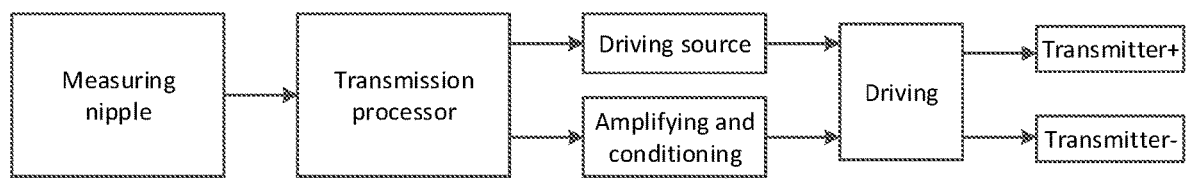
FIG. 2 shows a flow diagram of an electrode-type near-bit wireless short-distance transmission modulation method according to an embodiment of the present invention.

A near-bit measuring tool transmits acquired data to a transmission processor part by a wired 485 interface after measuring parameters such as drilling deviation and gamma. As shown in FIG. 2, the transmission processor part performs 2FSK modulation on a signal, then, loads the modulated signal passing through an amplifying circuit and a driving circuit to positive and negative electrodes of a transmitter according to a currently set transmission power and a set driving source power, and thus, electrode-type wireless short-distance transmission is realized.

Figure 3:
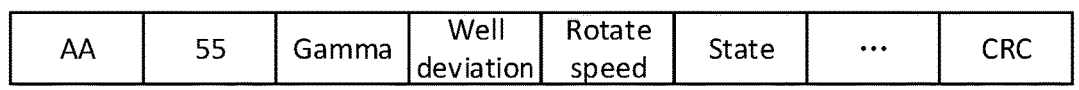
FIG. 3 shows a structural schematic diagram of a data packet according to an embodiment of the present invention.

As shown in FIG. 3, information (gamma, well deviation, the number of revolutions and the like) measured by the measuring tool forms a data packet, packet headers 0xAA and 0x55 are added at the head of the data packet, cyclic redundancy check (CRC) (bitwise XOR or addition can be adopted as a check mode) is added at the rear of the data packet, and the length of the overall data packet is decided according to information required to be acquired by ground personnel. Thereinto, gamma, well deviation, the number of revolutions, an instrument state and the like can be selected, the number of bytes of each piece of information is determined according to the precision and measurement range of the information, and 1 byte, 2 bytes and the like can be selected. The greater the length of the data packet is, the longer the transmission time is, and the larger the corresponding transmission power consumption is. Since near-bit measuring and transmitting tools are powered by batteries, if the transmission power consumption is too high, the working duration of an instrument will be shortened, and thus, a field instrument cannot be applied for a long time. Therefore, the selected bytes of the transmitted information should be short and succinct as much as possible if only a basic demand is met.

The transmission processor part performs detection on the packet header and CRC after receiving the data packet of the measuring tool. If a detection result is right, the transmission processor part performs binary frequency shift keying modulation on the overall data packet as information to be transmitted.

A data packet to be transmitted is subjected to 2FSK modulation according to bits, and a modulation rule is described as follows:

Bit=0, carrier wave f1=1.0 kHz, and there are 20 periods; and

Bit=1, carrier wave f2=1.5 kHz, and there are 40 periods.

Figure 4:
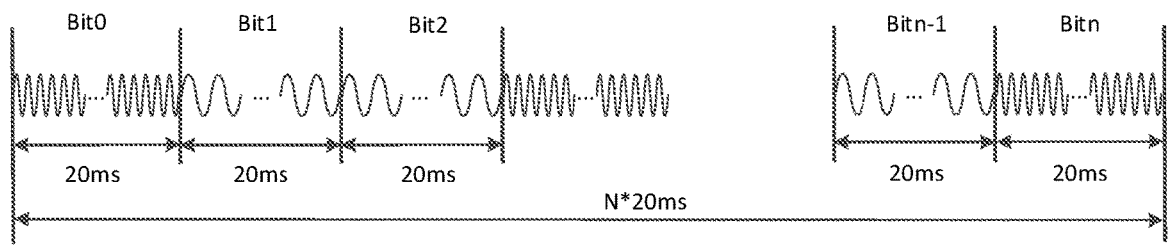
FIG. 4 shows a schematic diagram of modulation for each bit according to an embodiment of the present invention.

The carrier duration is 20*1 ms=20 ms after modulation for each bit, the transmission processor part is an STM32-series ARM processor with a DAC output function and sequentially completes modulation for each bit of the data packet to be transmitted according to the above-mentioned modulation rule. As shown in FIG. 4, the transmission time is N*20 ms, wherein N is a total number of transmitted bits.

The data packet to be transmitted is modulated according to the order of bits, and each bit is represented by multiple sinusoidal periodic signals with specific frequencies, the signal period of each bit lasts for 20 ms. The modulated signal is a bipolar sinusoidal signal, which is transmitted through the H-bridge circuit, and the two points of the load output of the H-bridge circuit are loaded to the positive and negative electrodes of the transmitter.

The signal received by the receiver is the difference between the negative signal and the weak signal received by the positive receiving electrode because the screw rod is conductive. The bit stream of the transmitted signal is obtained by measuring the weak signal. The signal loaded into the positive and negative electrodes of the transmitter is a bipolar sinusoidal signal which is measured by an oscilloscope (one end is connected to the ground of the probe, and the other end is connected to the pin of the probe), and the bipolar sinusoidal signal is a normal output form of H-bridge circuit. If the probe of oscilloscope is connected to the ground, and the pin of the probe is connected to the positive and negative electrodes respectively, the signals with a difference of 180° are obtained respectively, and the polarity of both signals is positive.

Embodiment 1

During field operation, a ground drilling engineer needs to acquire the attitude (well deviation and azimuth) of a bit, the drilling rate of the bit, upper and lower gammas and temperature in real time. According to such a requirement, a data packet transmission structure is configured before downhole operation of a near-bit instrument as shown in FIG. 5.

The upper and lower gammas are imaged according to a magnetic tool face angle and a gravity tool face angle within the range of 0-255. The well deviation occupies two bytes including a high byte H and a low byte L. The precision is 0.3°, and 12 bit is actually effective. The azimuth, the number of revolutions and the temperature occupies 1 byte respectively. Encoding is performed in a specific mode. The total number of transmitted bits is 80 bytes, the transmission time is 80*20 ms=1.6 s, and a transmitter performs transmission once every other 20 s. In terms of power consumption, based on different stratum environments, if the power consumption is Wt during transmission, the average power consumption of the transmitter is Wt*1.6/20. Thus, the transmitter can continuously work for a time T=Wc/(Wt*1.6/20), wherein Wc is an output power of a battery of the transmitter.

Embodiment 2

During field operation, in order to simplify an operation process, sometimes, a ground drilling engineer would ignore other drilling parameters, and upper and lower gammas and well deviation information are only needed. At the moment, a data packet transmission structure can be configured before downhole operation of a near-bit instrument as shown in FIG. 6.

At the moment, the total number of transmitted bits is 56 bytes, the transmission time is 56*20 ms=1.12 s, and a transmitter performs transmission once every other 20 s. Thus, the transmitter can continuously work for a time T=Wc/(Wt*1.12/20).

Embodiment 3

During field operation, the number of transmitted bits can be arbitrarily increased. However, with the increment of the number of the transmitted bits, if the power consumption of a battery is definite, the more the number of the transmitted bits is, the shorter the corresponding working duration is, and the working duration is shortened proportionally.

Embodiments of the present invention are described as above in conjunction with the accompanying drawings, but the present invention is not limited to the above-mentioned specific implementation approaches which are exemplary only and not restrictive, many forms can be further derived by a person of ordinary skill in the art without departing from the purpose of the present invention and the claimed range of claims under the enlightenment of the present invention, and these forms fall within the claimed range of the present invention.

The invention claimed is:

1. An electrode-type near-bit wireless short-distance transmission modulation method, comprising:
   measuring, by a near-bit measuring tool, parameters to acquire parameter information, packing the parameter information into a data packet, and transmitting the data packet to a transmission processor part;
   performing, by the transmission processor part, binary frequency shift keying modulation on the data packet, and loading the modulated data packet passing through an amplifying circuit and a driving circuit to positive and negative electrodes of a transmitter according to a set transmission power and driving source power; and
   transmitting, by the positive and negative electrodes of the transmitter, the modulated data packet passing through the amplifying circuit and the driving circuit to a receiver so as to realize electrode-type wireless short-distance transmission modulation,
   wherein before performing binary frequency shift keying modulation on the data packet, the transmission processor part further comprises the following operation: performing detection on the packet header and CRC after receiving the data packet, and under the condition that a detection result is right, performing binary frequency shift keying modulation on the overall data packet as information to be transmitted.

2. The electrode-type near-bit wireless short-distance transmission modulation method according to claim 1, wherein after measuring parameters to acquire parameter information, and packing the parameter information into a data packet, the near-bit measuring tool further comprises the following operation: adding packet headers 0xAA and 0x55 in front of the data packet, adding CRC at the rear of the data packet, and then, transmitting the data packet to the transmission processor part.

3. The electrode-type near-bit wireless short-distance transmission modulation method according to claim 2, wherein bitwise XOR or addition is adopted as a check mode.

4. The electrode-type near-bit wireless short-distance transmission modulation method according to claim 1, wherein the data packet is subjected to binary frequency shift keying modulation according to bits, and a modulation rule is described as follows:
   Bit=0, carrier wave f1=1.0 kHz, and there are 20 periods; and
   Bit=1, carrier wave f2=1.5 kHz, and there are 40 periods.

5. The electrode-type near-bit wireless short-distance transmission modulation method according to claim 4, wherein the transmission processor part is an STM32-series ARM processor with a DAC output function.

6. The electrode-type near-bit wireless short-distance transmission modulation method according to claim 5, wherein the transmission processor part sequentially completes modulation for each bit of a data packet to be transmitted according to the modulation rule, and the transmission time is N*20 ms, wherein N is a total number of transmitted bits.

7. The electrode-type near-bit wireless short-distance transmission modulation method according to claim 1, wherein the parameters comprise drilling deviation information, gamma information, number-of-revolutions information, instrument state information and/or temperature information.

8. The electrode-type near-bit wireless short-distance transmission modulation method according to claim 1, wherein the data packet is transmitted to the transmission processor part by a wired 485 interface.

9. An electrode-type near-bit wireless short-distance transmission modulation system, wherein the system performs electrode-type near-bit wireless short-distance transmission modulation by adopting the method according to claim 1 and comprises:
   a near-bit measuring tool, for measuring parameters to acquire parameter information, packing the parameter information into a data packet, and transmitting the data packet to a transmission processor part;
   the transmission processor part, for performing binary frequency shift keying modulation on the data packet, and loading the modulated data packet passing through an amplifying circuit and a driving circuit to positive and negative electrodes of a transmitter according to a set transmission power and driving source power; and
   the positive and negative electrodes of the transmitter, for transmitting the modulated data packet passing through the amplifying circuit and the driving circuit to a receiver so as to realize electrode-type wireless short-distance transmission modulation.

10. An electrode-type near-bit wireless short-distance transmission modulation system, wherein the system performs electrode-type near-bit wireless short-distance transmission modulation by adopting the method according to claim 2 and comprises:
    a near-bit measuring tool, for measuring parameters to acquire parameter information, packing the parameter information into a data packet, and transmitting the data packet to a transmission processor part;
    the transmission processor part, for performing binary frequency shift keying modulation on the data packet, and loading the modulated data packet passing through an amplifying circuit and a driving circuit to positive and negative electrodes of a transmitter according to a set transmission power and driving source power; and
    the positive and negative electrodes of the transmitter, for transmitting the modulated data packet passing through the amplifying circuit and the driving circuit to a receiver so as to realize electrode-type wireless short-distance transmission modulation.

11. An electrode-type near-bit wireless short-distance transmission modulation system, wherein the system performs electrode-type near-bit wireless short-distance transmission modulation by adopting the method according to claim 3 and comprises:
    a near-bit measuring tool, for measuring parameters to acquire parameter information, packing the parameter information into a data packet, and transmitting the data packet to a transmission processor part;

the transmission processor part, for performing binary frequency shift keying modulation on the data packet, and loading the modulated data packet passing through an amplifying circuit and a driving circuit to positive and negative electrodes of a transmitter according to a set transmission power and driving source power; and the positive and negative electrodes of the transmitter, for transmitting the modulated data packet passing through the amplifying circuit and the driving circuit to a receiver so as to realize electrode-type wireless short-distance transmission modulation.

12. An electrode-type near-bit wireless short-distance transmission modulation system, wherein the system performs electrode-type near-bit wireless short-distance transmission modulation by adopting the method according to claim 4 and comprises:

a near-bit measuring tool, for measuring parameters to acquire parameter information, packing the parameter information into a data packet, and transmitting the data packet to a transmission processor part;

the transmission processor part, for performing binary frequency shift keying modulation on the data packet, and loading the modulated data packet passing through an amplifying circuit and a driving circuit to positive and negative electrodes of a transmitter according to a set transmission power and driving source power; and the positive and negative electrodes of the transmitter, for transmitting the modulated data packet passing through the amplifying circuit and the driving circuit to a receiver so as to realize electrode-type wireless short-distance transmission modulation.

13. An electrode-type near-bit wireless short-distance transmission modulation system, wherein the system performs electrode-type near-bit wireless short-distance transmission modulation by adopting the method according to claim 5 and comprises:

a near-bit measuring tool, for measuring parameters to acquire parameter information, packing the parameter information into a data packet, and transmitting the data packet to a transmission processor part;

the transmission processor part, for performing binary frequency shift keying modulation on the data packet, and loading the modulated data packet passing through an amplifying circuit and a driving circuit to positive and negative electrodes of a transmitter according to a set transmission power and driving source power; and the positive and negative electrodes of the transmitter, for transmitting the modulated data packet passing through the amplifying circuit and the driving circuit to a receiver so as to realize electrode-type wireless short-distance transmission modulation.

14. An electrode-type near-bit wireless short-distance transmission modulation system, wherein the system performs electrode-type near-bit wireless short-distance transmission modulation by adopting the method according to claim 6 and comprises:

a near-bit measuring tool, for measuring parameters to acquire parameter information, packing the parameter information into a data packet, and transmitting the data packet to a transmission processor part;

the transmission processor part, for performing binary frequency shift keying modulation on the data packet, and loading the modulated data packet passing through an amplifying circuit and a driving circuit to positive and negative electrodes of a transmitter according to a set transmission power and driving source power; and the positive and negative electrodes of the transmitter, for transmitting the modulated data packet passing through the amplifying circuit and the driving circuit to a receiver so as to realize electrode-type wireless short-distance transmission modulation.

15. An electrode-type near-bit wireless short-distance transmission modulation system, wherein the system performs electrode-type near-bit wireless short-distance transmission modulation by adopting the method according to claim 7 and comprises:

a near-bit measuring tool, for measuring parameters to acquire parameter information, packing the parameter information into a data packet, and transmitting the data packet to a transmission processor part;

the transmission processor part, for performing binary frequency shift keying modulation on the data packet, and loading the modulated data packet passing through an amplifying circuit and a driving circuit to positive and negative electrodes of a transmitter according to a set transmission power and driving source power; and the positive and negative electrodes of the transmitter, for transmitting the modulated data packet passing through the amplifying circuit and the driving circuit to a receiver so as to realize electrode-type wireless short-distance transmission modulation.

16. An electrode-type near-bit wireless short-distance transmission modulation system, wherein the system performs electrode-type near-bit wireless short-distance transmission modulation by adopting the method according to claim 8 and comprises:

a near-bit measuring tool, for measuring parameters to acquire parameter information, packing the parameter information into a data packet, and transmitting the data packet to a transmission processor part;

the transmission processor part, for performing binary frequency shift keying modulation on the data packet, and loading the modulated data packet passing through an amplifying circuit and a driving circuit to positive and negative electrodes of a transmitter according to a set transmission power and driving source power; and the positive and negative electrodes of the transmitter, for transmitting the modulated data packet passing through the amplifying circuit and the driving circuit to a receiver so as to realize electrode-type wireless short-distance transmission modulation.

\* \* \* \* \*